US012617130B2

(12) United States Patent
    Kameno et al.

(10) Patent No.: US 12,617,130 B2
(45) Date of Patent: May 5, 2026

(54) MANUFACTURING OF MOLDED ARTICLE USING A COMPOSITION FOR MOLDING CONTAINING A PYROLYTIC WATER DISCHARGE SUBSTANCE AND A FIBROIN

(71) Applicant: CANON VIRGINIA, INC., Newport News, VA (US)

(72) Inventors: Yu Kameno, Kanagawa (JP); Jun Miura, Kanagawa (JP); Akira Yane, Tokyo (JP)

(73) Assignee: CANON VIRGINIA, INC., Newport News, VA (US)

( * ) Notice: Subject to any disclaimer, the term of this patent is extended or adjusted under 35 U.S.C. 154(b) by 0 days.

(21) Appl. No.: 18/518,242

(22) Filed: Nov. 22, 2023

(65) Prior Publication Data

US 2025/0162209 A1 May 22, 2025

(51) Int. Cl.
    *B29C 43/00* (2006.01)
    *B29C 43/52* (2006.01)
    *B29K 509/00* (2006.01)

(52) U.S. Cl.
    CPC ........... *B29C 43/003* (2013.01); *B29C 43/52* (2013.01); *B29K 2089/00* (2013.01); *B29K 2509/00* (2013.01)

(58) Field of Classification Search
    CPC .............. B29C 43/34; B29C 2043/147; B29C 2043/106; B29C 43/02; B29C 43/04; B29C 43/006; B29C 43/003
    See application file for complete search history.

(56) References Cited

U.S. PATENT DOCUMENTS

2018/0050109 A1* 2/2018 Kaplan .................. C08J 9/0085
2019/0233481 A1* 8/2019 Morita ................. C07K 14/435

FOREIGN PATENT DOCUMENTS

CN        108715652 A    10/2018
WO      2017/047503 A1    3/2017
WO      2017/222034 A1   12/2017
WO      2019/054503 A1    3/2019

* cited by examiner

*Primary Examiner* — Stella K Yi

(74) *Attorney, Agent, or Firm* — Canon U.S.A., Inc., IP Division

(57) ABSTRACT

The present disclosure relates to a method for manufacturing a molded article in which the molding ability of a protein is improved. Also provided is a composition for molding consisting of at least a mixture of a protein and a pyrolytic water discharge substance is compressed to produce a molded article.

11 Claims, 6 Drawing Sheets

| | Process | Item | | Embod. 1 | Embod. 2 | Embod. 3 |
|---|---|---|---|---|---|---|
| 1 | Protein aqueous solution preparation | Protein A | | Silkworm silk | Silkworm silk | Silkworm silk |
| | | % by weight | | 6.17% | 6.17% | 6.17% |
| | | molecular weight | | 155 kDa | 155 kDa | 155 kDa |
| 2 | Pyrolytic substance and third component mixed aqueous solution preparation | Pyrolytic water discharge substance H | Substance name | Ammonium bicarbonate | | |
| | | | Weight loss rate at 50°C | -0.75% | | |
| | | | Temperature and time required to complete pyrolysis | 100°C 2 minutes 35 seconds | | |
| | | | Weight % after pyrolysis, $P_H$ | 0% | | |
| | | | Water discharge weight %, Pw | 22.1% | | |
| | | | Weight % relative to protein | 6% | 20% | 100% |
| | | Third component B | Substance name | None | None | None |
| | | | Weight % relative to protein | - | - | - |
| 3 | Dewatering | Freeze-drying process | Drying method | Sheet form frozen -30°C 30Pa 3h → Freeze-dried -6°C 30Pa 24h | | |
| 4 | Processing and verification of the composition for molding | Protein & third component | Dry weight ratio, $P_{AB}$ | 91.5% | 91.5% | 91.5% |
| | | Post-addition solvent | Solvent type | - | - | - |
| | | | % of post-added solvent relative to protein | - | - | - |
| | | Composition for molding | Dry weight ratio $P_{ABH}$ | 86.6% | 77.0% | 48.0% |
| | | | Effective weight concentration of pyrolytic water x | 5.4% | 15.8% | 47.5% |
| | | | Effective solvent weight % relative to protein weight y | 1.3% | 3.8% | 11.5% |
| 5 | Molding | Molding mold | Size | 1 cm x 1 cm | 1 cm x 1 cm | 1 cm x 1 cm |
| | | | Surface roughness Ra (μm) | 4 μm | | |
| | | Molding process | Molding method | Die compression molding | | |
| | | | Molding temperature and time | 120°C 5 minutes | 120°C 5 minutes | 120°C 5 minutes |
| | | | Equipment load | 10 kN | 10 kN | 10 kN |
| | | | Pressure (MPa) | 100 | 100 | 100 |
| 6 | Crystallization rate | Molded part crystallization rate (%) | | 52.1 | 54.3 | 55.6 |
| 7 | Surface roughness | Molded part (μm) | | 3.4 | 3.6 | 3.4 |

FIG. 2A
AMENDED

| | Process | | Item | Comp. Ex. 1 | Embod. 4 | Embod. 5 |
|---|---|---|---|---|---|---|
| 1 | Protein aqueous solution preparation | | Protein A | Silkworm silk | Silkworm silk | Silkworm silk |
| | | | % by weight | 6.17% | 6.17% | 6.17% |
| | | | molecular weight | 155 kDa | 155 kDa | 155 kDa |
| 2 | Pyrolytic substance and third component mixed aqueous solution preparation | Pyrolytic water discharge substance H | Substance name | None | Sodium bicarbonate | |
| | | | Weight loss rate at 50°C | - | -0.54% | |
| | | | Temperature and time required to complete pyrolysis | | 150°C 3 minutes 27 seconds | |
| | | | Weight % after pyrolysis, $P_H$ | | 62.9% | |
| | | | Water discharge weight percentage $P_W$ | | 10.7% | |
| | | | Weight % relative to protein | | 10% | 100% |
| | | Third component B | Substance name | None | None | None |
| | | | Weight % relative to protein | - | - | - |
| 3 | Dewatering | Freeze-drying process | Drying method | Sheet form frozen -30°C 30Pa 3h → Freeze-dried -6°C 30Pa 24h | | |
| 4 | Processing and verification of the composition for molding | Protein & third component | Dry weight ratio, $P_{AB}$ | 91.5% | 91.5% | 91.5% |
| | | Post-addition solvent | Solvent type | - | - | - |
| | | | % of post-added solvent relative to protein | - | - | - |
| | | Composition for molding | Dry weight ratio $P_{ABH}$ | 91.5% | 83.6% | 47.1% |
| | | | Effective weight concentration of pyrolytic water x | 0.0% | 8.6% | 48.5% |
| | | | Effective solvent weight % relative to protein weight y | 0.0% | 2.1% | 11.7% |
| 5 | Molding | Molding mold | Size | 1 cm x 1 cm | 1 cm x 1 cm | 1 cm x 1 cm |
| | | | Surface roughness Ra (μm) | 4 μm | | |
| | | Molding process | Molding method | Die compression molding | | |
| | | | Molding temperature and time | 120°C 5 minutes | 170°C 5 minutes | 170°C 5 minutes |
| | | | Equipment load | 10 kN | 10 kN | 10 kN |
| | | | Pressure (MPa) | 100 | 100 | 100 |
| 6 | Crystallization rate | | Molded part crystallization rate (%) | | 37.2 | 51 |
| 7 | Surface roughness | | Molded part (μm) | | 1.7 | 3.1 |

FIG. 2B
AMENDED

| | Process | Item | | | Comp. Ex. 2 | Comp. Ex. 3 | Comp. Ex. 4 |
|---|---|---|---|---|---|---|---|
| 1 | Protein aqueous solution preparation | Protein A | | | Silkworm silk | Silkworm silk | Silkworm silk |
| | | % by weight | | | 6.17% | 6.17% | 6.17% |
| | | molecular weight | | | 155 kDa | 155 kDa | 155 kDa |
| 2 | Pyrolytic substance and third component mixed aqueous solution preparation | Pyrolytic water discharge substance H | Substance name | | None *Mix directly into the composition for molding as a liquid solvent | | |
| | | | Weight loss rate at 50°C | | | | |
| | | | Temperature and time required to complete pyrolysis | | | | |
| | | | Weight % after pyrolysis, $P_H$ | | | | |
| | | | Water discharge weight %, $P_W$ | | | | |
| | | | Weight % relative to protein | | | | |
| | | Third component B | Substance name | | None | None | None |
| | | | Weight % relative to protein | | - | - | - |
| 3 | Dewatering | Freeze-drying process | Drying method | | Sheet form frozen -30°C 30Pa 3h → Freeze-dried -6°C 30Pa 24h | | |
| 4 | Processing and verification of the composition for molding | Protein & third component | Dry weight ratio, $P_{AB}$ | | 91.5% | 91.5% | 91.5% |
| | | Post-addition solvent | Solvent type | | Water | Water | Ethanol |
| | | | % of post-added solvent relative to protein | | 11.5% | 39.0% | 39.0% |
| | | Composition for molding | Dry weight ratio $P_{ABH}$ | | 91.5% | 91.5% | 91.5% |
| | | | Effective weight concentration of pyrolytic water x | | - | - | - |
| | | | Effective solvent weight % relative to protein weight y | | 11.2% | 29.9% | 29.9% |
| 5 | Molding | Molding mold | Size | | 1 cm x 1 cm | 1 cm x 1 cm | 1 cm x 1 cm |
| | | | Surface roughness Ra (μm) | | 4 μm | | |
| | | Molding process | Molding method | | Die compression molding | | |
| | | | Molding temperature and time | | 170°C 5 minutes | 170°C 5 minutes | 170°C 5 minutes |
| | | | Equipment load | | 10 kN | 10 kN | 10 kN |
| | | | Pressure (MPa) | | 70 | 100 | 100 |
| 6 | Crystallization rate | Molded part crystallization rate (%) | | | 37.2 | 50.9 | 21.9 |
| 7 | Surface roughness | Molded part (μm) | | | 1.9 | 2.4 | 1.7 |

FIG. 2C
AMENDED

| | Process | Item | | Embod. 6 | Embod. 7 | Embod. 8 |
|---|---|---|---|---|---|---|
| 1 | Protein aqueous solution preparation | Protein A | | Silkworm silk | Silkworm silk | Hornet silk |
| | | % by weight | | 6.21% | 6.17% | 6.51% |
| | | molecular weight | | 201 kDa | 155 kDa | 45 kDa |
| 2 | Pyrolytic substance and third component mixed aqueous solution preparation | Pyrolytic water discharge substance H | Substance name | Ammonium bicarbonate | | |
| | | | Weight loss rate at 50°C | -0.75% | | |
| | | | Temperature and time required to complete pyrolysis | 100°C 2 minutes 35 seconds | | |
| | | | Weight % after pyrolysis, $P_H$ | 0.0% | | |
| | | | Water discharge weight percentage $P_W$ | 22.1% | | |
| | | | Weight % relative to protein | 20% | 20% | 20% |
| | | Third component B | Substance name | None | Starch | None |
| | | | Weight % relative to protein | - | 100% | - |
| 3 | Dewatering | Freeze-drying process | Drying method | Sheet form frozen -30°C 30Pa 3h → Freeze-dried -6°C 30Pa 24h | | |
| 4 | Processing and verification of the composition for molding | Protein & third component | Dry weight ratio, $P_{AB}$ | 90.8% | 89.4% | 92.1% |
| | | Post-addition solvent | Solvent type | - | - | - |
| | | | % of post-added solvent relative to protein | - | - | - |
| | | Composition for molding | Dry weight ratio $P_{ABH}$ | 76.4% | 75.2% | 77.5% |
| | | | Effective weight concentration of pyrolytic water x | 15.8% | 15.8% | 15.8% |
| | | | Effective solvent weight % relative to protein weight y | 3.9% | 3.9% | 3.8% |
| 5 | Molding | Molding mold | Size | 1 cm x 1 cm | 1 cm x 1 cm | 1 cm x 1 cm |
| | | | Surface roughness Ra (µm) | 4 µm | | |
| | | Molding process | Molding method | Die compression molding | | |
| | | | Molding temperature and time | 120°C 5 minutes | 120°C 5 minutes | 120°C 5 minutes |
| | | | Equipment load | 10 kN | 10 kN | 10 kN |
| | | | Pressure (MPa) | 100 | 100 | 100 |
| 6 | Crystallization rate | Molded part crystallization rate (%) | | 51.9 | 54.2 | 53.4 |
| 7 | Surface roughness | Molded part (µm) | | 3.1 | 3.2 | 3.5 |

FIG. 2D
AMENDED

MANUFACTURING OF MOLDED ARTICLE USING A COMPOSITION FOR MOLDING CONTAINING A PYROLYTIC WATER DISCHARGE SUBSTANCE AND A FIBROIN

FIELD OF THE DISCLOSURE

The present disclosure relates to a method for manufacturing a molded article containing fibroin.

BACKGROUND

Efforts have been made to process various products using hydrophilic fibroin.

Since fibroin is highly hydrophilic and the binding strength between molecules caused by hydrogen bonds is strong, when applying heat or pressure in the molding process, binding between molecules occurs, and the fluidity of the protein may decrease, and therefore usually relatively high pressure is required.

WO 2019054503 A1 provides a method for molding in which a protein is molded at a relatively low pressure by adding a solvent such as water to improve the fluidity.

However, it was difficult to mix homogeneously with protein with a small amount of solvent, which could result in insufficient shape transferability at low pressure in areas that did not sufficiently mix with the solvent. In addition, due to the rate of molding and hardening of the protein becoming uneven within the plane, the propagation of pressure could become uneven, which could lead to shape transferability becoming insufficient. On the other hand, when increasing the amount of solvent, the fluidity of protein could improve at low pressure. However, due to the sudden vaporization-heat of water caused by the heat of the molding of the protein was deprived of heat, and there were cases where without the protein flowing a molded part of the desired shape could not be obtained.

The present disclosure aims to improve molding fluidity when obtaining a molded part containing protein.

SUMMARY OF THE DISCLOSURE

The present disclosure relates to a method for manufacturing comprising a process for heating a composition for molding containing a pyrolytic water discharge substance, which decomposes due to pyrolysis to generate water molecules, and a fibroin, and a process for applying pressure and molding while subjecting the pyrolytic water discharge substance to pyrolysis.

These and other embodiments, objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

The accompanying drawings, which are incorporated herein and form part of the specification, illustrate various embodiments, objects, features, and advantages of the present disclosure.

FIG. 2A-D is a table providing results from the present Examples.

Figure 1:
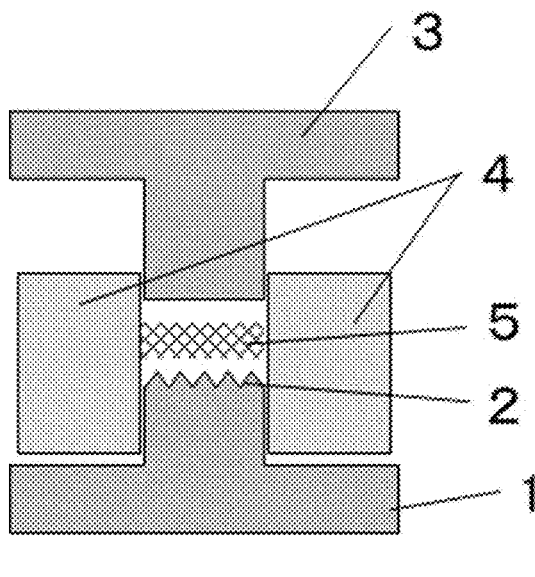
FIG. 1 is a schematic cross sectional view of the mold for molding used in the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

Composition for Molding

The composition for molding of the present disclosure contains a pyrolytic water discharge substance. In the specification of this application, pyrolytic water discharge substance means a compound that is a solid below normal temperature, but whose structure decomposes by heat (pyrolysis), and contains water molecules in the decomposed substance. Here, a normal temperature is, for example, 27° C. By mixing a pyrolytic water discharge substance with a molding element (for example, a protein-containing powder) and compression molding it, the pyrolytic water discharge substance decomposes due to the heat generated during molding. The fluidity of the protein improves by the protein absorbing the water generated at this time. That is, the viscosity of a composition can be decreased.

Figure 3:
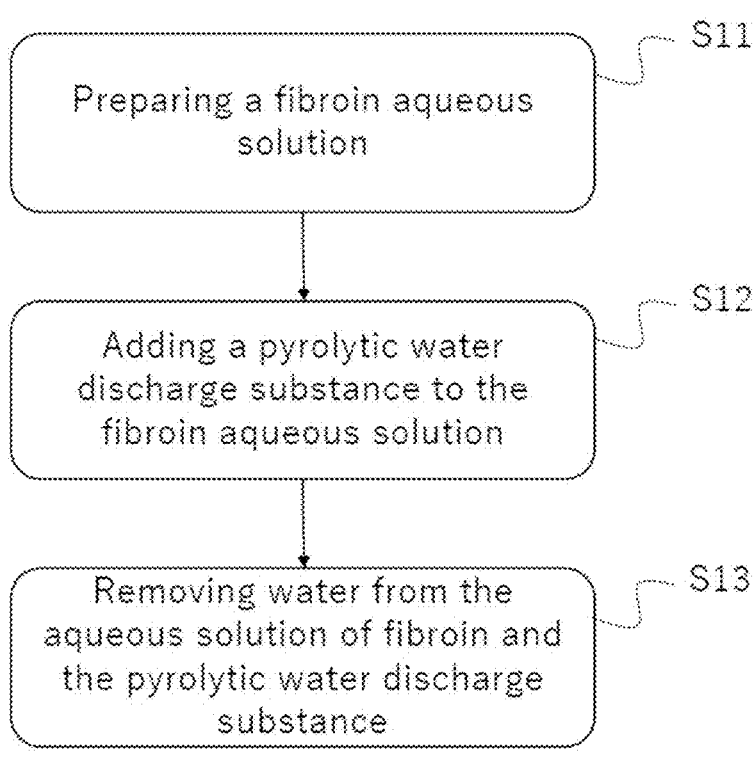
FIG. 3 is a process flowchart depicting a method for obtaining a powder according to the present disclosure.

An exemplary process for obtaining a composition for molding is described in FIG. 3. In step S11, an aqueous solution is prepared as otherwise described in the present disclosure above. In Step S12, a pyrolytic water discharge substance is added to the aqueous solution as described herein above. In Step S13, water is removed from the aqueous solution comprising the pyrolytic water discharge substance as described herein above. The dry sheet forms of the composition resulting from Step S13 can then be ground into powder.

For the decomposition of the pyrolytic water discharge substance, the amount of weight loss obtained when heating at a temperature-raising rate of 10° C. per minute from 30° C. can be less than 1 part by weight at 50° C. in TGA measurement. In case of a higher decomposition rate, pyrolysis can proceed even at room temperature. In addition, the pyrolysis starting temperature (T1 (° C.)) of the pyrolytic water discharge substance can be below the protein decomposition starting temperature. If it is above that, it becomes necessary to raise the molding temperature to the vicinity of the decomposition start temperature of the protein in order to generate water from the pyrolytic water discharge substance, and the protein may deteriorate during molding. Here, the deterioration of protein refers to the covalent bonds in the molecular chains that make up the proteins breaking, and the molecular weight decreasing. When protein deterioration occurs, the mechanical strength, etc. of the molded part obtained after molding decreases, and the sense of unity as a molded part is impaired. It is normally said that the starting temperature of protein decomposition is around 200° C., and the pyrolytic water discharge substance can complete decomposition at 180° C. or lower.

It is possible to confirm the starting temperature of protein decomposition with thermos-gravimetric analysis (TGA). First, heating the sample to 120° C. at a temperature-raising rate of 10° C. per minute under atmospheric pressure, and then maintaining the temperature for 30 minutes to remove the impact of moisture, follow it by further heating to 400° C. at a temperature-raising rate of 1° C. per minute. In the weight loss graph obtained at this time, define the intersecting point, between the straight line extending the straight line to the high temperature side when the weight stabilizes at 120° C. and the tangent at the inflection point of the weight loss in decomposition, as the decomposition start temperature.

Whether the decomposition temperature of a pyrolytic water discharge substance completes at 180° C. or lower, can be confirmed by TGA of the pyrolytic water discharge substance by itself. Specifically, in the TGA measurement, when the sample is heated at a temperature-raising rate of 10° C. per minute from 30° C. to 500° C., the rate of weight loss at 180° C. or lower is compared with the rate of weight loss at 180° C. or higher, and if the latter is negligibly small, it can be said that the decomposition completed at 180° C. Set the decomposition rate at the time of this decomposition completion as 100%. Separately, by heating from 30° C. to 100° C. or to 150° C., setting the temperature at a constant temperature, and measuring the time required for the decomposition rate to reach 100%, it can be set as an indicator of the temperature and time conditions for processing such as molding.

The amount of water released from the pyrolytic water discharge substance can be calculated based on the molecular structure and the decomposition reaction equation. It can also be confirmed by letting it decompose by heating the solid to the decomposition temperature or above in a flask of a distillation apparatus, cooling the generated steam, and recovering the amount of water droplets recovered. In addition, in the case of pyrolytic water discharge substances, such as ammonium carbonate or ammonium bicarbonate, that do not contain solids in the decomposed substance, it can also be confirmed by examining the weight gain of the entire container after letting the substance decompose by heating in a sealed container, cooling the container, and removing the generated gas.

The pyrolytic water discharge substance is not particularly limited as long as it is a substance that releases water molecules through pyrolysis, but examples include bicarbonates such as sodium bicarbonate, potassium bicarbonate, ammonium bicarbonate, etc., and ammonium carbonate, for example. These example substances can be used solely or in any combination as pyrolysis water emission substances. These carbonates also release water molecules when they release carbonic acid, and can improve the fluidity of protein. Among these, ammonium bicarbonate and ammonium carbonate can be used because almost all of the components evaporate during pyrolysis, making it difficult for them to remain in the molded part, thereby reducing the effect of the properties on the molded part. In addition, ammonium bicarbonate and ammonium carbonate can also be used based on the fact that the larger the weight (Pw) of water released during pyrolysis relative to the weight of the pyrolytic water discharge substance is, the greater the effect on protein fluidity during molding becomes.

The pyrolytic water discharge substance can be mixed with protein in any proportion, but the water generated by pyrolysis can also or alternatively be captured (absorbed) by the protein. Therefore, the composition for molding of the present disclosure may contain a third component such as an additive, but the protein content of the composition for molding, excluding the pyrolytic water discharge substance, should be 50 parts by weight or more so that the properties of the protein itself are not impaired after molding.

A fibroin can be used as a protein. Among the materials called fibroins, especially bio-based polymer materials composed of amino acids such as silk fibroin purified from silkworm cocoons, hornet silk produced by wasp larvae, and spider silk made from spider thread are particularly useful because of their strong hydrophilicity. Among these, one type or a mixture of a plurality of types may be used.

The molecular weight of the protein can be 30 kDa or more and 300 kDa or less. If it is less than 30 kDa, the mechanical strength of the molded part may decrease and this is not desirable. In addition, if it is greater than 300 kDa, the flow effect due to water becomes small, because the viscosity of the material itself is too high, which is undesirable.

Method for Manufacturing Composition for Molding

The present method for manufacturing consists of a process for preparing a protein aqueous solution, a process for mixing a pyrolytic water discharge substance into a protein aqueous solution, a process for removing water from the mixed aqueous solution, and a process for processing the mixture as a composition for molding. Below describes each process.

Figure 4:
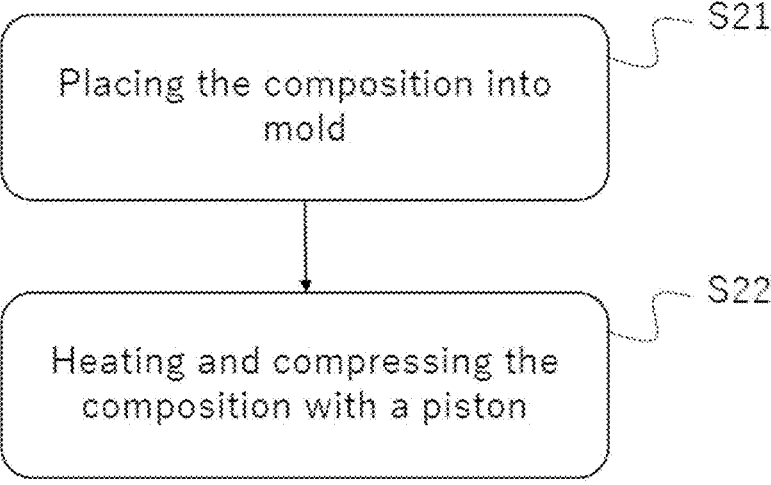
FIG. 4 is a process flowchart depicting a method for molding according to the present disclosure.

An exemplary process for molding the powder is provided in FIG. 4. In Step S21, the composition prepared as described herein is placed into a mold. In Step S22, the composition is compressed with a piston during heating.

Process for Preparing Protein Aqueous Solution

The protein aqueous solution can be manufactured, for example, by the method for manufacturing the silk worm silk aqueous solution described in WO 2006/101223 or the method for manufacturing the spider silk aqueous solution described in U.S. Pat. No. 5,245,012. When using these, aqueous solutions, in which hydrophilic proteins have uniformly dissolved, can be obtained. When the viscosity of the aqueous solution is high, it makes it difficult for the pyrolytic water discharge substance mixed in the next process to mix uniformly, so the protein concentration in the aqueous solution can be 2 parts by weight or more to 30 parts by weight or less. The weight concentration of the protein can be determined by TGA. Specifically, it is determined by heating 20 to 100 mg of a well-agitated aqueous solution at a temperature-raising rate of 10° C. per minute from 30° C. to 120° C. Then, maintaining 120° C. for 30 minutes to evaporate the water to complete the measurement, and using the ratio of the final weight relative to the weight at the start of the measurement as the weight concentration of the protein.

Process for Mixing Pyrolytic Water Discharge Substance

Next, the protein aqueous solution prepared in the above process is mixed with a substance that generates water during pyrolysis (a pyrolytic water discharge substance). By dissolving both the protein and the pyrolytic water discharge substance in water, the pyrolytic water discharge substance can be uniformly dispersed in an aqueous solution. In the next process, since mixing unevenness is reduced by removing water from this aqueous solution both the protein and the pyrolytic water discharge material can be dissolved in water.

Process for Dewatering

In this process, the dry body of the mixture is produced by removing water from the aqueous solution prepared in the previous process. For the method to remove water, methods such as freeze-drying, spray drying, vacuum drying, vibration drying, drum drying, air-drying can be utilized, and these methods may be combined. Among these, freeze-drying, in which the effect of heat on the mixture is small, or spray drying, in which the solution is heated for a short time, can have additional benefits.

When the freeze-drying method is used, the freezing temperature is not particularly limited as long as the aqueous solution freezes. However, the freezing point of the aqueous solution in which the solute has dissolved is lower than the freezing point of the water, so the freezing temperature can be −10° C. or lower, or −20° C. or lower. The temperature when drying under reduced pressure after freezing can be 20° C. or lower so that the impact of the temperature on the pyrolytic water discharge substance becomes smaller, or the temperature can be 10° C. or lower or 0° C. On the other hand, the lower the drying temperature, the longer it takes to dewater, so drying at −20° C. or higher can be performed, or at −15° C. or higher. There is no problem if the pressure is 600 Pa or less, which is the pressure at the triple point of water, in a sample that is sufficiently frozen, but if the sample is partially liquefied due to temperature unevenness, the pressure can be 100 Pa or less, or 50 Pa or less, because the aqueous solution foams. The vacuum can be released when the temperature of the dried substance after removing the moisture reaches 10° C. or higher. If it is lower than this, condensation will occur inside the sample, and the dry substance will absorb water, which is not desirable because it may cause gelation of the protein, etc.

When using spray drying, the protein concentration of the aqueous solution may be adjusted in advance to make it easier to spray. Reducing the time the pyrolytic water discharge substance is exposed to heat as much as possible can be achieved by adjusting the air pressure and flow rate of the spray. If the heating of the device during spraying leads to heating of the pyrolytic water discharge substance, it can be sprayed while cooling the surroundings of the device with a cooling device or the like.

Process for Processing a Composition for Molding

The composition obtained by removing water can be used as a composition for molding by using it as is, and it can also be used as a composition for molding by processing it into various forms. There are no particular restrictions on the processing method, but examples include pelletizing, sheeting, powdering and flaking. For example, a dry body in the bulk state after freeze-drying can be ground using a jet mill, hammer mill, ball mill, pin mill, etc. to make a powdery composition for molding. In addition, after grinding, a powdery material with a uniform particle size can be obtained by performing classification. Furthermore, pellet-like materials can be obtained by cutting flake-like materials extruded into strands and by pressing flake-like materials into shapes such as cylinders at room temperature.

The effective weight fraction x of the pyrolytic water discharge substance in the composition for molding can be determined from the following equation:

$$PABH = (1 - x) \times PAB + x \times PH$$

That is, $$x = (PABH - PAB) / (PH - PAB) \tag{1}$$

Here, PABH is the rate of weight change of the composition for molding when it is heated and dried. PAB is the rate of weight change of the composition (protein and third component only), with the pyrolytic water discharge substance removed from the composition for molding, when it is heated and dried, and PH is the rate of weight change of the pyrolytic water discharge substance itself, when it is heated and dried. If PAB and PH are obtained in advance by measuring, x can be obtained using equation (1). For example, if composing a composition only of protein with a decomposition start temperature of 200° C. and pyrolytic water discharge substance with a decomposition completion temperature of 150° C., without using a third component and each is heated to 150° C. with TGA, PAB and PH can be determined from the weights before and after measurement. In addition, when measuring the mixed composition for molding with the same temperature conditions, PABH can be obtained, so x can be determined. Furthermore, if the weight ratio after the dry weight of the protein is set as PA, the effective solvent weight ratio y with respect to the weight of the protein can be calculated with the following equation (2).

$$y = x \times Pw / PA \tag{2}$$

Method for Molding of Composition for Molding

Molding the composition for molding of the present disclosure can be performed while decomposing the contained pyrolytic water discharge substance by heat and pressure. For the molding temperature and the molding time, based on the decomposition time of the pyrolytic water discharge substance previously investigated, molding can be performed at a higher temperature and for a longer time than that. Molding at this temperature or below can be disadvantageous, because substances that generate water during pyrolysis do not decompose sufficiently. In addition, molding at or below the deterioration start temperature of the protein is desired. Furthermore, to promote the integration of the molded part, a suitable molding time can be selected so the protein crystallization ratio will be 50% or more.

Although it is possible to use any method for molding without particular specification, several types of molding methods including injection molding, extrusion molding, and compression molding, are usable.

The molding pressure can be 300 MPa or less, similar to the pressure used in the molding of ordinary thermoplastic resins, and can be 100 MPa or less. A pressure higher than 300 MPa is not desirable because the equipment load increases in proportion to the molded part size and the capital investment cost increases. In addition, to perform a shape transfer, molding can be performed at 10 MPa or more.

Method for Measuring the Crystallization Ratio of Molded Parts

For the crystallization ratio of the molded part, refer to the method described in Nature Materials 19, 102-108 (2020), and determine it with the description below. Specifically, first, the infrared absorption spectrum of the molded part surface is measured every 1 cm-1 in the range from 1580 cm-1 to 1720 cm-1. A linear function passing through the value at 1580 cm-1 and the value at 1720 cm-1 of the obtained spectrum is calculated, set as a baseline, and subtracted from the measurement values. Take the obtained spectrum as the sum of the four spectra, derived from random coils, beta-sheet I, beta-sheet II, and beta-turns, and call it the effective spectrum.

On the other hand, the spectra derived from random coils can be approximated by a variable with peak centers between 1645 cm-1 and 1655 cm-1, and the spectra derived from beta-sheet I, beta-sheet II, and beta-turns can be approximated by the sum of Gaussian functions with peak centers having fixed values of 1620, 1698 and 1685 cm-1, respectively. In the four Gaussian functions, determine the sum of the peak intensity and deviation of the Gaussian function as a variable, and set it as a composite spectrum with nine variables.

In the range of 1580 cm-1 to 1720 cm-1, determine the absolute value of the difference between the effective spectrum and the synthetic spectrum every 1 cm-1, calculate the total sum, and set it as the spectral error. Set the spectral error relative to the integral value of the effective spectrum as the error rate, and fit the nine variables of the synthetic spectrum so that the error rate becomes small. Assume that the spectrum converges when the error rate after fitting is 3% or less, and regard the four spectra constituting the synthetic spectrum as the spectra of each actual component. Finally, calculate the sum of the three spectral integral values derived from beta-sheet I, beta-sheet II, and beta-turns relative to the integral value of the effective spectrum ranging from 1580 cm-1 to 1720 cm-1 as the crystallization rate in the present disclosure. Because the crystallization rate (sum of beta-sheet I, beta-sheet II, and beta-turns) in the case of silk fibroin is considered less than 20% in the dry state before heat molding, and 50% or more after heat molding, it can be judged a molded part having strength, if the rate of crystallization in the present disclosure exceeds 50%.

Fitting can be carried out using the software included with the infrared absorption spectrum measurement device, the graph analysis software, the solver add-ins within Microsoft Excel software, etc.

Method for Evaluation of Shape Transferability

Shape transferability can be evaluated by the Ra of the surface of the molded part, obtained when resin is pressed against a flat mold with a surface roughness Ra (arithmetic mean roughness) of 4 μm and then molded. When the Ra of the surface of the molded part is larger than 3 μm, it can be said that the shape transferability is high, and that the fluidity of the protein is also high. If the Ra is 3 μm or less, it can be judged that the transfer ratio is low. Note that Ra can be measured by a contact-type measurement method using a tactile needle or a non-contact-type measurement method using a laser or light.

EXAMPLES

Example 1

Step 1: Step for Preparing a Protein Aqueous Solution

In this step, a protein aqueous solution consisting of silk fibroin, which is an animal-derived protein, was prepared.

First, after washing silkworm cocoons with water, they were boiled in a 0.02 mol/L sodium carbonate aqueous solution for 30 minutes, to conduct degumming. The degummed silk thread was dissolved by pouring it into a 9.3 mol/L LiBr aqueous solution and agitating it at 60° C. for 4 hours. Desalination was performed using 30/32 cellulose tubes (fractional molecular weight of 12000 to 14000) manufactured by Sekisui Chemical Co. Ltd. After further dilution with pure water, it was confirmed that the aqueous solution is homogeneous without precipitate in a visual inspection. This aqueous solution was used as the protein aqueous solution. A thermal analysis of 73.157 mg of the aqueous solution was conducted using a TGA (TGA 8000 manufactured by PerkinElmer Inc.). After heating it from 30 to 120° C. with a temperature-raising rate of 10° C. per minute, and after heating it continuously at 120° C. for 30 minutes, it became 4.511 mg. From this, it was understood that the weight concentration of the protein was 6.17%. After that, heating it further to 400° C. with a temperature-raising rate of 1° C. per minute, and upon determining the decomposition starting temperature from the weight loss curve, the decomposition starting temperature was 185° C. In addition, the protein's molecular weight was measured by SDS-PAGE. For the detailed procedure of SDS-PAGE, the procedure disclosed in L. S. Wray et al., J Biomed Mater Res B Appl Biomater. 2011 October; 99 (1): 89-101 was used. The resulting molecular weight measured by this method was 155 kDa.

Step 2: Step for Mixing a Pyrolytic Water Discharge Substance

In this step, ammonium bicarbonate was selected as the pyrolytic water discharge substance, and a mixture with a protein aqueous solution was prepared.

First, to confirm the temperature suitable for pyrolysis, after heating 7.108 mg of ammonium bicarbonate (Manufactured by Kishida Chemical Co., Ltd., Special Grade) from 30° C. to 100° C. at a temperature-raising rate of 10° C. per minute using a TGA 8000, it was maintained at 100° C. for 30 minutes, and the amount of weight loss was measured. As a result, first, it became clear that it decreased 0.75 parts by weight at the point of 50° C. This confirmed that ammonium bicarbonate is roughly stable at room temperature. Then, after starting to maintain it at 100° C., at 2 minutes and 35 seconds, the sample weight became zero. This confirmed that it is a material, which gasifies completely when heated at 100° C. or higher, and for 3 minutes or longer.

In addition, after placing 5.3 g of the ammonium bicarbonate in a glass container, sealing it, and heating it at 100° C. for 30 minutes, and then bringing it back to room temperature, releasing the seal, and removing the generated gas, it was possible to confirm a water film on the bottom of the container, and the container weight had increased by 1.2 g. Thus, the weight percentage of water (Pw) available from ammonium bicarbonate became 22.1 parts by weight, which was confirmed to be consistent with the calculated value from the molecular formula.

Ammonium bicarbonate was mixed and agitated so it became 6 parts by weight relative to the protein of which the weight concentration was measured in the previous process.

One hour after mixing, the mixed aqueous solution was checked visually, but no precipitate was observed, and it was homogeneous.

Step 3: Step for Dewatering

In this step, water was removed from the aqueous solution.

After the solution mixed with ammonium bicarbonate in step 2 and the protein aqueous solution not mixed with ammonium bicarbonate obtained in step 1 were spread on separate trays to be 5 mm thick respectively, the trays were placed on shelves in a freeze-dryer (Manufactured by Tokyo Rika Machinery, model number FD-550P) and cooled to −30° C. After 3 hours, after freezing was confirmed visually, decompression was started −6° C. at 30 Pa, to start the dewatering. After 24 hours, after letting the sample temperature increase to 15° C. decompression was released, and the dry bodies in sheet form were taken out. The two types of sheets remained in the same condition visually after one week of aging, and gelation, etc. did not occur.

Step 4: Step for Verifying the Composition for Molding

From the pyrolysis results of step 2, the molding temperature and molding time in the next step were assumed as 120° C., and 5 minutes, respectively.

After heating ammonium bicarbonate by itself, the protein sheet not containing ammonium bicarbonate obtained in step 3, and the protein sheet containing ammonium bicarbonate with a temperature-raising rate of 60° C. per minute from 30° C. to 120° C., and maintaining them at a temperature of 120° C. for 3 minutes, the weight changes were measured with TGA. Analysis of the measured results revealed that the weight ratios after measurement were 0.0, 0.915 and 0.866, respectively. These values were set as PH, PAB and PABH in equation (1). From this, the fraction x of ammonium bicarbonate could be calculated to be 5.4 parts by weight.

Step 5: Step for Molding

In this step, the protein sheets containing ammonium bicarbonate, obtained in step 4, were molded using a mold with a roughened surface.

First, a 1 cm2 of lower piston 1 with a roughened surface 2 was prepared. When conducting a non-contact measurement of the surface roughness with a 10×LT objective lens set on an OPTELICS HYBRID+ manufactured by Lasertec Corporation, Ra was 4.0 µm. This piston 1 was used as the lower die, and a piston guide 4 with a square prism-shaped through-hole of 1 cm2 as shown in FIG. 1, and a piston 3 of 1 cm2 without surface roughening were assembled as the upper die, and a compressed body mixed with pyrolytic water discharge substance 5 (composition for molding) was installed in the die.

The die was set in a die compression-molding machine (VN02-2020C, manufactured by Mikado Technos Co., Ltd.) in which the press plate had been preheated to 120° C. in advance, and the die was heated and compressed with a load of 10 kN so the molding pressure became 100 MPa. After 5 minutes, the load was released and air-cooled, and when the temperature had cooled to 40° C., the mold was disassembled, and the molded body was taken out.

Step 6: Step for Evaluating the Crystallization Ratio

To calculate the crystallization rate of the molded body from the infrared absorption spectrum, the infrared absorption spectrum of the surface of the molded part was measured with the ATR method using an FT-IR/NIR spectrometer Frontier manufactured by PerkinElmer Inc. When measuring this spectrum according to the method of crystallization rate measurement, and determining the crystallization rate, it was 52.1%, confirming that the crystallization rate is advanced.

Step 7: Step for Evaluating the Shape Transferability

When measuring the surface roughness of the molded part, Ra was 3.4 µm, confirming that the transfer is sufficient.

Example 2

In step 2 of Example 1, a process similar to Example 1 was performed, except that an aqueous solution was prepared so the ammonium bicarbonate was 20 parts by weight relative to the protein. The percentage x of ammonium bicarbonate in the composition obtained in step 4, the amount of water in the composition for molding, the crystallization rate of the molded part, and the Ra of the surface of the molded part were as shown in the table provided in FIG. 2A-D.

Example 3

In step 2 of Example 1, a process similar to Example 1 was performed, except that an aqueous solution was prepared so the ammonium bicarbonate was 100 parts by weight relative to the protein. The percentage x of ammonium bicarbonate in the composition for molding, the crystallization rate of the molded part, and the Ra of the surface of the molded part were as shown in the table provided in FIG. 2A-D.

Comparative Example 1

Using the dry body of the protein without ammonium bicarbonate mixed in obtained in step 3 of Example 1, the process for molding of step 5 was carried out. The Ra of the surface if the obtained molded part was as shown in the table provided in FIG. 2A-D.

Example 4

After preparing the protein aqueous solution in the same manner as in step 1 of Example 1, sodium bicarbonate was selected as the pyrolytic water discharge substance in step 2. Using a TGA8000, heating 9.176 mg of sodium bicarbonate (Manufactured by Kishida Chemical Co., Ltd., Special Grade) from 30° C. to 150° C. at a temperature-raising rate of 10° C. per minute, and maintaining it at 150° C. for 30 minutes, finally the weight loss was measured from 150° C. to 400° C. at a temperature-raising rate of 10° C. per minute. Analysis of the measured revealed that the weight loss at the point of 50° C. was 0.67 parts by weight, and confirmed it is stable at room temperature. In addition, after starting to maintain it at 150° C., it became clear that the sample weight is stable at 3 minutes and 27 seconds. After that, the weight is stable up to 400° C., and the final weight became 62.9% relative to the initial weight. This almost matches the 63.1% residual amount of sodium carbonate assumed in the decomposition reaction formula, and confirmed that it is a material that completes decomposition at 150° C. or higher and for 5 minutes or longer. Thus, the weight percentage of water (Pw) available from sodium bicarbonate was set as 10.7 parts by weight as per the decomposition reaction formula.

The sodium bicarbonate was mixed and agitated to become 10 parts by weight relative to the protein, whose weight concentration was measured in the previous process. One hour after mixing, the liquid mixture was visually checked, but no precipitate was observed, and it was homogeneous.

After performing a process similar to step 3 of Example 1, the percentage c of sodium bicarbonate was calculated in step 4. Step 5 was performed with the molding temperature set at 170° C., and when measuring the Ra of the surface of the obtained molded part, it was as shown in the table provided in FIG. 2A-D.

Example 5

A process similar to Example 4 was performed except that sodium bicarbonate was mixed and agitated so that it became 100 parts by weight relative to the protein. The Ra of the surface of the obtained molded part was as shown in the table provided in FIG. 2A-D.

Comparative Example 2

To 1.9 g of a dry body of protein obtained in the process of dewatering of step 3 of Example 1, into which ammonium bicarbonate was not mixed, 0.2 g of water was added at room temperature. The amount of water was so small that the dry body of protein had an uneven wetting pattern, and it was not possible to apply the water evenly. This mixture was poured into a mold in the same manner as step 5 of Example 1, and molded. The Ra of the surface of the obtained molded part was as shown in the table provided in FIG. 2A-D.

Comparative Example 3

To 1.4 g of a dry body of protein obtained in the process of dewatering of step 3 of Example 1, into which ammonium bicarbonate was not mixed, 0.5 g of water was added at room temperature. When mixing it with an agitating rod, an adhesive gelatinous mixture is obtained. This mixture was poured into a mold in the same manner as step 5 of Example 1, and molded. The Ra of the surface of the obtained molded part was as shown in the table provided in FIG. 2A-D.

Comparative Example 4

To 1.4 g of a dry body of protein obtained in the process of dewatering of step 3 of Example 1, into with ammonium bicarbonate was not mixed, 0.5 g of liquid ethanol was added at room temperature. The ethanol appeared to be mixing with the protein in a visual inspection. This mixture was poured into a mold in the same manner as in step 5 of Example 1, and molded, but the molded part was crumbly. This may be due to removing the water required for crystallization from the surface by the ethanol.

Example 6

In this Example, silkworm silk with a high molecular weight was used. Specifically, a protein aqueous solution with a weight concentration of 6.21% consisting of a silk fibroin with a molecular weight of 201 kDa was prepared by shortening the boiling refining time in step 1 of Example 1.

Example 7

A liquid mixture of protein and starch was prepared by adding starch to the aqueous solution prepared in step 1 of Example 1. Specifically, using a starch aqueous solution of 1 weight concentration (Kishida Chemical Co., Ltd. manufactured Type 910-00564), it was mixed so that the starch content was 100 parts by weight relative to the protein, and agitated. Step 2 through step 7 were performed in the same manner as Example 2. The Ra of the surface of the obtained molded part was as shown in the table provided in FIG. 2A-D.

Example 8

In this Example, a protein aqueous solution consisting of hornet silk was prepared.

In step 1, first, cocoons collected from wasp nests were cut into pieces of approximately 5 mm in size, and to the extent that they could be visually confirmed, impurities were removed. Placing the cocoon fragments in a 9 mol/L LiBr aqueous solution, and agitating them at 40° C. for 1 hour, the cocoon fragments were dissolved. The agitated LiBr aqueous solution was centrifuged, to separate and remove the impurities, which are insoluble components.

Next, the LiBr aqueous solution, from which the impurities were removed, was placed in a 30/32 cellulose tube (fractional molecular weight 12000 to 14000) manufactured by Sekisui Chemical Co., Ltd., and dialysis was performed in distilled water at room temperature for 4 days to remove LiBr. When confirming the obtained protein concentration and the fractional molecular weight, they were 6.51 parts by weight and 45 kDa, respectively.

From step 2 onward, when conducting the process in the same manner as in Example 2 to produce the molded part, the Ra of the surface of the obtained molded part was as shown in the table provided in FIG. 2A-D.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/ or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for manufacturing a molded article comprising: heating a composition for molding containing a pyrolytic water discharge substance which decomposes due to pyrolysis to generate water molecules, and a fibroin, and applying pressure to mold the composition while pyrolyzing the pyrolytic water discharge substance,
    wherein an increase in the amount of weight (Pw) of water released during pyrolysis relative to a weight of the pyrolytic water discharge substance provides an increase in fluidity of the fibroin during molding.

2. The method for manufacturing a molded article according to claim 1, wherein the crystallization rate of the fibroin in the molded article is 50% or more.

3. The method for manufacturing a molded article according to claim 1, wherein the molding temperature in the process for the molding is not less than T1 and not more than T1+100° C. where the starting temperature of the pyrolysis of the pyrolytic water discharge substance is T1.

4. The method for manufacturing a molded article according to claim 1, wherein the molding pressure in the process for the molding is 10 MPa or more and 300 MPa or less.

5. The method for manufacturing a molded article according to claim 1, wherein the composition is obtained by a method comprising:
    obtaining an aqueous solution in which the pyrolytic water discharge substance and a fibroin are dissolved, and
    obtaining the composition by removing water as a solvent from the aqueous solution.

6. The method for manufacturing a molded article according to claim 5, wherein the concentration of the fibroin in the aqueous solution is 2 parts by weight or more and 30 parts by weight or less relative to water as the solvent.

7. The method for manufacturing a molded article according to claim 5, wherein the water as the solvent is removed from the aqueous solution by using a freeze-drying method or a spray-drying method.

8. The method for manufacturing a molded article according to claim 1, wherein the pyrolytic water discharge substance contains at least one of sodium bicarbonate, potassium bicarbonate, ammonium bicarbonate, or ammonium carbonate.

9. The method for manufacturing a molded article according to claim 1, wherein the amount of water generated from the pyrolytic water discharge substance during pyrolysis is 1 part by weight or more to 50 parts by weight or less relative to the fibroin.

10. The method for manufacturing a molded article according to claim 1, wherein the fibroin is made from silkworm silk and/or its derivatives.

11. The method for manufacturing a molded article according to claim 1, wherein the molecular weight of the fibroin is 30 kDa or more and 300 kDa or less.

\* \* \* \* \*